United States Patent
Lin et al.

(10) Patent No.: US 10,684,842 B2
(45) Date of Patent: Jun. 16, 2020

(54) PORTABLE ELECTRONIC DEVICE AND DATA UPDATING METHOD

(71) Applicant: Acer Incorporated, New Taipei (TW)

(72) Inventors: Shih-Hao Lin, New Taipei (TW); Chao-Kuang Yang, New Taipei (TW); Wen-Cheng Hsu, New Taipei (TW); Wen-Ping Chang, New Taipei (TW); Chih-Hsueh Huang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 15/696,272

(22) Filed: Sep. 6, 2017

(65) Prior Publication Data

US 2018/0074810 A1 Mar. 15, 2018

(30) Foreign Application Priority Data

Sep. 12, 2016 (TW) .............................. 105129550 A

(51) Int. Cl.
*G06F 8/65* (2018.01)
*H04L 12/24* (2006.01)
(Continued)

(52) U.S. Cl.
CPC ................ *G06F 8/65* (2013.01); *G06F 8/654* (2018.02); *H04L 41/082* (2013.01); *H04L 67/10* (2013.01);
(Continued)

(58) Field of Classification Search
CPC . G06F 8/65; G06F 8/60; G06F 9/4406; G06F 1/163; G06F 17/5095; G06F 19/30
See application file for complete search history.

(56) References Cited

U.S. PATENT DOCUMENTS 7,617,222 B2 * 11/2009 Coulthard ......... G06F 17/30179
7,908,401 B2 * 3/2011 Chang .................. G06F 13/385
709/220
(Continued)

FOREIGN PATENT DOCUMENTS

CN 104142663 A 11/2014
CN 104142664 A 11/2014
(Continued)

OTHER PUBLICATIONS

Heshann A. Odat et al.; Firmware Over the Air for Automotive Fotamotive; IEEE; pp. 130-139; retrieved on Jan. 14, 2020 (Year: 2014).*
(Continued)

*Primary Examiner* — S. Sough
*Assistant Examiner* — Cuong V Luu
(74) *Attorney, Agent, or Firm* — McClure, Qualey & Rodack, LLP

(57) ABSTRACT

A portable electronic device includes a transmission interface, a wireless communication circuit and microprocessor. The wireless communication circuit connects to a cloud server through the Internet. The microprocessor obtains firmware-version information and device-setting information of an electronic device through the transmission interface, and controls the wireless communication circuit to send the firmware-version information and the device-setting information to the cloud server. When the cloud server determines that the firmware version of the electronic device is not the latest firmware version according to the firmware-version information or determines that a device setting of the electronic device is not the latest device setting according to the device-setting information, the portable electronic device fetches the latest firmware information message and the latest device setting message from the cloud server, and
(Continued)

transmits the latest firmware information message and the latest device setting message to the electronic device.

16 Claims, 3 Drawing Sheets

(51) Int. Cl.
| | |
|---|---|
| *G06F 8/654* | (2018.01) |
| *H04L 29/08* | (2006.01) |
| *H04W 4/80* | (2018.01) |
| *H04L 29/06* | (2006.01) |
| *H04W 84/12* | (2009.01) |
| *H04W 88/02* | (2009.01) |

(52) U.S. Cl.
CPC .......... *H04L 67/34* (2013.01); *H04L 65/4069* (2013.01); *H04W 4/80* (2018.02); *H04W 84/12* (2013.01); *H04W 88/02* (2013.01)

(56) References Cited

U.S. PATENT DOCUMENTS

| | | | | |
|---|---|---|---|---|
| 8,230,095 | B2* | 7/2012 | Tsui | G06F 9/4416 |
| | | | | 709/203 |
| 9,009,357 | B2* | 4/2015 | Asnaashari | G06F 3/0605 |
| | | | | 710/8 |
| 9,055,033 | B2* | 6/2015 | Mergener | H04L 69/03 |
| 9,917,737 | B2* | 3/2018 | Neilson | H04L 41/0869 |
| 9,917,908 | B1* | 3/2018 | Knecht | H04L 67/20 |
| 9,928,197 | B2* | 3/2018 | Lu | G06F 9/441 |
| 10,154,356 | B2* | 12/2018 | Bazzoni | G06F 19/3418 |
| 2004/0003013 | A1* | 1/2004 | Coulthard | G06F 17/30179 |
| 2004/0125782 | A1* | 7/2004 | Chang | G06F 13/385 |
| | | | | 370/338 |
| 2006/0031547 | A1* | 2/2006 | Tsui | G06F 9/4416 |
| | | | | 709/231 |
| 2009/0271533 | A1* | 10/2009 | Asnaashari | G06F 3/0605 |
| | | | | 710/13 |
| 2011/0035741 | A1* | 2/2011 | Thiyagarajan | G06F 8/65 |
| | | | | 717/170 |
| 2013/0326495 | A1 | 12/2013 | Reunamaki et al. | |
| 2014/0025834 | A1* | 1/2014 | Mergener | H04L 69/03 |
| | | | | 709/230 |
| 2015/0293869 | A1* | 10/2015 | Lu | G06F 13/4221 |
| | | | | 710/5 |
| 2015/0350031 | A1 | 12/2015 | Burks et al. | |
| 2016/0013993 | A1 | 1/2016 | Chan | |
| 2016/0049069 | A1* | 2/2016 | Oliveira | G08B 25/10 |
| | | | | 340/539.11 |
| 2016/0078403 | A1 | 3/2016 | Sethi et al. | |
| 2016/0191318 | A1* | 6/2016 | Neilson | H04L 41/0869 |
| | | | | 709/220 |
| 2016/0330291 | A1 | 11/2016 | Asenjo et al. | |
| 2017/0147322 | A1* | 5/2017 | Vopni | G06F 8/654 |
| 2017/0187807 | A1* | 6/2017 | Clemon | H04W 4/70 |
| 2018/0146310 | A1* | 5/2018 | Bazzoni | G06F 19/3418 |

FOREIGN PATENT DOCUMENTS

| | | |
|---|---|---|
| CN | 105278979 A | 1/2016 |
| TW | 201544964 A | 12/2015 |

OTHER PUBLICATIONS

Ondrej Kachman et al.; Firmware Update Manager a Remote Firmware Reprogramming Tool for Low-Power Devices; IEEE; 4 pages; retrieved on Jan. 14, 2020 (Year: 2017).*

Chinese language office action dated Jul. 26, 2017, issued in application No. TW 105129550.

* cited by examiner

PORTABLE ELECTRONIC DEVICE AND DATA UPDATING METHOD

CROSS REFERENCE TO RELATED APPLICATIONS

This Application claims priority of Taiwan Patent Application No. 105129550, filed on Sep. 12, 2016, the entirety of which is incorporated by reference herein.

BACKGROUND OF THE DISCLOSURE

Field of the Disclosure

The present invention relates to a portable electronic device and a data updating method, and in particular to a portable electronic device and a data updating method for updating an external electronic device through a cloud server.

Description of the Related Art

Commercial devices, such as professional coffee machines, are usually manufactured in large quantities, and then are sold to general stores or chain stores. After that, the stores sell a product which is made by the commercial device to the general public to earn a profit.

However, these kinds of devices are usually complicated and precise, so the devices need regular maintenance and updates. The devices cannot be maintained or updated through the Internet directly. For example, the firmware of the device cannot be updated through the Internet. As a result, the manufacturer usually assigns maintenance personnel to visit the store, and then the maintenance personnel maintains the commercial device, updates it with the latest firmware for the commercial device, and adjusts the device settings of the commercial device using a specific device or instrument. However, this method consumes a lot of manpower, and managing the firmware version and related device setting data is a big issue.

Therefore, a convenient method and a device for easily updating commercial devices is an important issue worthy of study.

BRIEF SUMMARY OF THE DISCLOSURE

As a result, the disclosure provides a portable electronic device and a data updating method, to solve the above issue.

The disclosure provides a portable electronic device, applied to update data. The portable electronic device includes a transmission interface, a wireless communication circuit and a microprocessor. The transmission interface is configured to connect to an electronic device. The wireless communication circuit is configured to be connected to a cloud server through the Internet. The microprocessor obtains firmware-version information and device-setting information of the electronic device through the transmission interface, and the microprocessor controls the wireless communication circuit to send the firmware-version information and the device-setting information to the cloud server. When the cloud server determines that the firmware version of the electronic device is not the latest firmware version according to the firmware-version information or determines that a device setting of the electronic device is not the latest device setting according to the device-setting information, the portable electronic device fetches the latest firmware version message and the latest device setting message from the cloud server, and transmits the latest firmware version message and the latest device setting message to the electronic device.

According to disclosure, the invention further discloses a data updating method, applied to a cloud service, an electronic device and a portable electronic device, the method includes: connecting the portable electronic device with the electronic device through a transmission interface; obtaining firmware-version information and device-setting information of the electronic device by a micro-processor of the portable electronic device; transmitting the firmware-version information and the device-setting information to the cloud server by the microprocessor which controls a wireless communication circuit of the portable electronic device; determining, by the cloud server, whether a firmware version of the electronic device is a latest firmware version according to the firmware-version information or determining, by the cloud server, whether a device setting of the electronic device is a latest device setting according to the device-setting information; transmitting, by the cloud server, a latest firmware version message and a latest device setting message to the portable electronic device when the cloud server determines that the firmware version of the electronic device is not the latest firmware version or determines that the device setting of the electronic device is not the latest device setting; and transmitting, by the micro-processor, the latest firmware version message and the latest device setting message to the electronic device.

The present disclosure provides an updating system which includes a portable electronic device, an electronic device, and a cloud server. The maintenance personnel of the electronic device only needs to connect the portable electronic device to the electronic device, and then some information, such as the firmware version and the device setting, of the electronic device can be obtained through the portable electronic device. In addition, the cloud server receives the information to determine whether the firmware version of the electronic device is the latest firmware version or whether the device setting of the electronic device is the latest device setting. If the firmware version is not the latest firmware version or the device setting is not the latest device setting, the portable electronic device fetches the latest firmware file and the latest device-setting file from the cloud server using streaming technology and transmits the latest firmware file and the latest device-setting file to the electronic device, so as to update the firmware and the device setting of the electronic device.

Therefore, maintenance personnel do not need to prepare several devices storing different version of the firmware files and the device-setting files to update different electronic devices, such as different coffee machines. The maintenance personnel can maintain different electronic device only using a single portable electronic device. As a result, the present disclosure solves the problem of the conventional updating method consuming a lot of manpower and is not convenient to manage data. Moreover, the cloud server determines and chooses the best device-setting file among several device-setting files as the latest device-setting file according to the date, the season, the location, the altitude, the humidity, and so on, of the electronic device, so as to achieve the purpose of customization.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE ILLUSTRATIVE EMBODIMENTS

Figure 1:
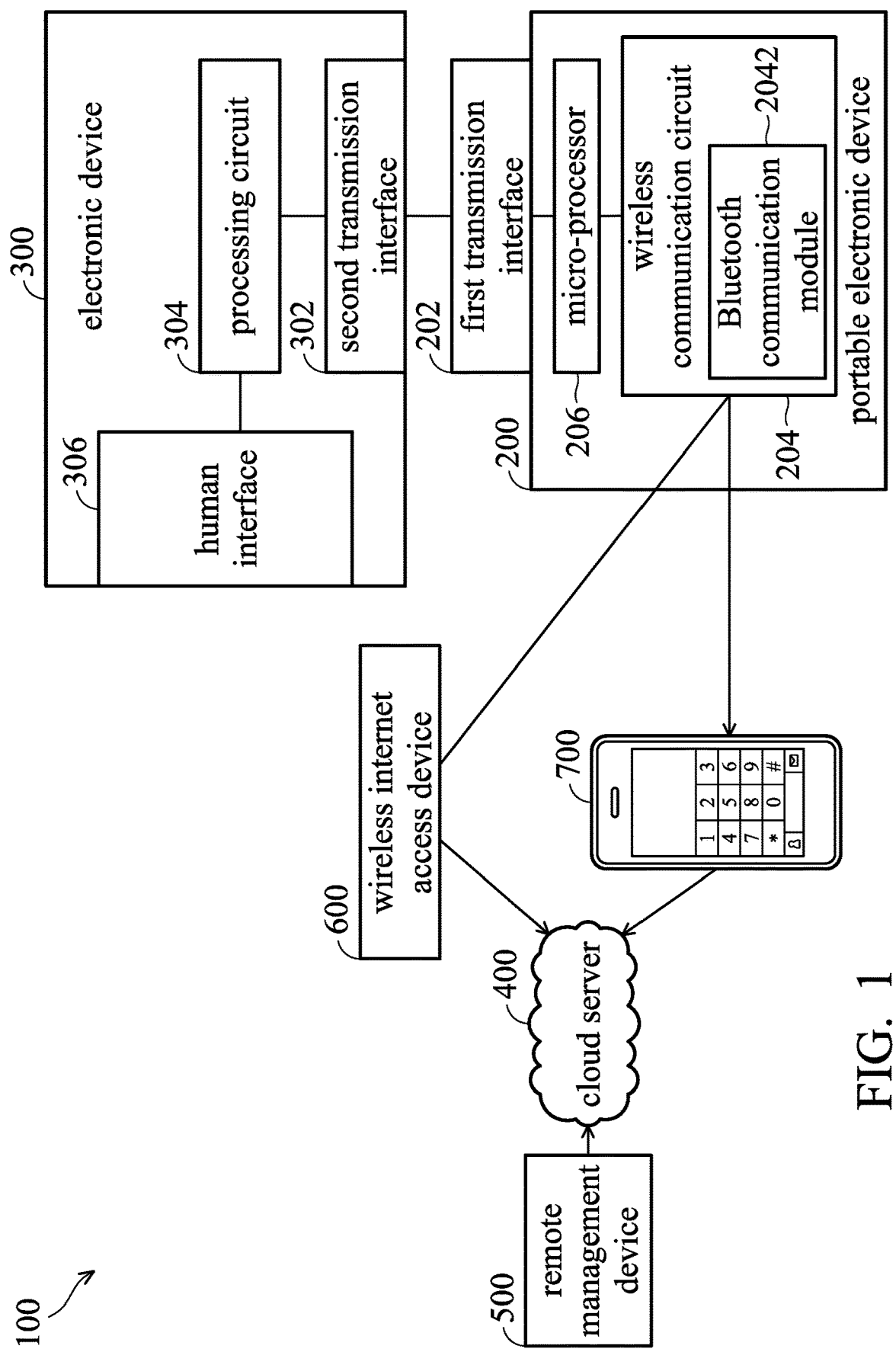
FIG. 1 is a block diagram of an updating system according to an embodiment of the present disclosure.

Please refer to FIG. 1, which is a diagram of an updating system 100 according to an embodiment of the present disclosure. The updating system 100 includes a portable electronic device 200, an electronic device 300, a cloud server 400 and a remote management device 500. The portable electronic device 200 is a device with a small size. For example, the appearance of the portable electronic device 200 can be design like a USB flash drive. The portable electronic device 200 can include a first transmission interface 202, a wireless communication circuit 204 and a microprocessor 206. The first transmission interface 202 can be connected to the microprocessor 206 and can transmit data to the microprocessor 206. The first transmission interface 202 can be a Universal Serial Bus (USB) port. The wireless communication circuit 204 is connected to the cloud server 400 through a wireless internet access device 600 or a mobile device 700. The wireless communication circuit 204 can include a mobile communication module and a WIFI module. The microprocessor 206 can transmit data through the wireless communication circuit 204 or the first transmission interface 202.

The electronic device 300 can be a coffee machine, an air conditioner or another large electromechanical device. The electronic device 300 can include a second transmission interface 302, a processing circuit 304, and a human interface 306. The second transmission interface 302 is configured to be connected to the first transmission interface 202. The human interface 306 is configured to display message and is configured to be touched by a user to receive an input signal. After that, the human interface 306 transmits the input signal to the processing circuit 304. The processing circuit 304 is used for controlling the second transmission interface 302 to transmit data to the portable electronic device 200. The electronic device 300 operates with a specific operation system, such as Linux system or Android system. The electronic device 300 can include a storage device (not shown in the figures), which is electrically connected to the processing circuit 304, and the storage device stores an operation system version, firmware-version information, and device-setting information.

The cloud server 400 can store a lot of data related to the electronic device 300, such as several versions of firmware files and several device-setting files. The wireless internet access device 600 can be a router or a wireless base station. When the wireless internet access device 600 is the router, the WIFI module in the wireless communication circuit 204 of the portable electronic device 200 can communicate with the cloud server 400 through the router. When the wireless internet access device 600 is the wireless base station, the mobile communication module in the wireless communication circuit 204 of the portable electronic device 200 can communicate with the cloud server 400 through the wireless base station. The remote management device 500 can be a remote computer, which is connected to the cloud server 400 through the Internet, so as to manage the firmware files and the device-setting files. For example, the remote management device 500 can upload the latest firmware file or delete unnecessary firmware files.

The mobile device 700 can be a personal digital assistant (PDA), a smartphone, a tablet, a mobile phone, a mobile Internet device (MID), a notebook computer, or any other type of mobile computing device. Devices capable of connecting the portable electronic device 200 to the cloud server 400 are within the scope of the disclosure, and it will be understood by a person skilled in the art that the present disclosure is not limited to those devices.

When the user wants to update data of the electronic device 300 through the portable electronic device 200, the user can connect the first transmission interface 202 of the portable electronic device 200 to the second transmission interface 302 of the electronic device 300. When the first transmission interface 202 and the second transmission interface 302 are exemplarily USB ports and are connected to each other, the portable electronic device 200 can obtain electricity from the electronic device 300 through the first transmission interface 202 and the second transmission interface 302, so that the portable electronic device 200 is turned on from a closed state to an open state.

Next, the mobile device 700 can be set up in a hotspot mode by the user, so that the mobile device 700 can be connected to the portable electronic device 200. Then, the user performs a control application on the mobile device 700, and the mobile device 700 sends a version-choosing signal to the portable electronic device 200 according to the control application. For example, when the electronic device 300 operates with Linux system, the user can choose a button which represents Linux system on the interface of the control application. After that, the microprocessor 206 generates a file system table according to the version-choosing signal, and the file system table is compatible with the operation system. For example, the microprocessor 206 generates a file system table compatible with Linux system. Then, the microprocessor 206 controls the first transmission interface 202 to transmit the file system table to the electronic device 300, so that the electronic device 300 can recognize the portable electronic device 200 after receiving the file system table.

In another embodiment, the portable electronic device 200 can further include an input interface (not shown in the figures) for the user to choose an operation system version of the electronic device 300. The user's choice serves as an input signal. The input interface generates the version-choosing signal according to the input signal, so that the microprocessor 206 of the portable electronic device 200 generates a file system table compatible with the operation system version according to the version-choosing signal.

When electronic device 300 recognizes the portable electronic device 200, the microprocessor 206 of the portable electronic device 200 can obtain firmware-version information and device-setting information of the electronic device 300 through the first transmission interface 202 and the second transmission interface 302. Next, the microprocessor 206 controls the wireless communication circuit 204 to transmit the firmware-version information and the device-setting information to the cloud server 400. The wireless communication circuit 204 can transmit information to the cloud server 400 through the wireless internet access device 600, or through the mobile device 700 when the mobile device 700 operates in the hotspot mode.

When the cloud server 400 receives the firmware-version information and the device-setting information of the electronic device 300, the cloud server 400 determines whether a firmware version of the electronic device 300 is the latest firmware version according to the firmware-version information and determines whether a device setting of the electronic device 300 is the latest device setting according to the device-setting information. If the firmware version of the electronic device 300 is not the latest firmware version and the device setting of the electronic device 300 is not the latest device setting, the cloud server 400 transmits the latest firmware version message and the latest device setting message to the portable electronic device 200. Next, the microprocessor 206 transmits the latest firmware version message and the latest device setting message to the electronic device 300.

In some embodiments, the wireless communication circuit 204 can include a Bluetooth communication module 2042, and the wireless communication circuit 204 communicates with the cloud server 400 through the wireless internet access device 600. At this time, the mobile device 700 can communicate with the portable electronic device 200 through the Bluetooth communication module 2042. When the portable electronic device 200 receives the latest firmware version message and the latest device setting message, the portable electronic device 200 can also transmit the latest firmware version message and the latest device setting message to the mobile device 700 through the Bluetooth communication module 2042, so that the latest firmware version message and the latest device setting message can be displayed on a display screen of the mobile device 700.

It should be noted that the latest firmware version message and the latest device setting message are only displaying messages, and do not include data of the firmware file or the device-setting file.

Then, when the electronic device 300 receives the latest firmware version message and the latest device setting message, the human interface 306 displays the latest firmware version message and the latest device setting message, so as to ask the user whether to update data (that is, updating the latest firmware version and the latest device setting). For example, when the human interface 306 receives an input signal, which is exemplarily generated from touching a confirmation button displayed on the human interface 306 by the user, the input signal is transmitted to the processing circuit 304. Next, the processing circuit 304 generates a confirmation message according to the input signal, and the processing circuit 304 transmits the confirmation message to the portable electronic device 200 through the second transmission interface 302. When the portable electronic device 200 receives the confirmation message, the portable electronic device 200 downloads the latest firmware file and the latest device-setting file stored in the cloud server 400 using streaming technology and transmits the latest firmware file and the latest device-setting file to the electronic device 300, so that the electronic device 300 starts to update the firmware and the device setting. It should be noted that the cloud server 400 determines and chooses the best device-setting file among those device-setting files as the latest device-setting file according to the date, the season, the location, the altitude, the humidity, and so on, of the electronic device 300.

Figure 2A:
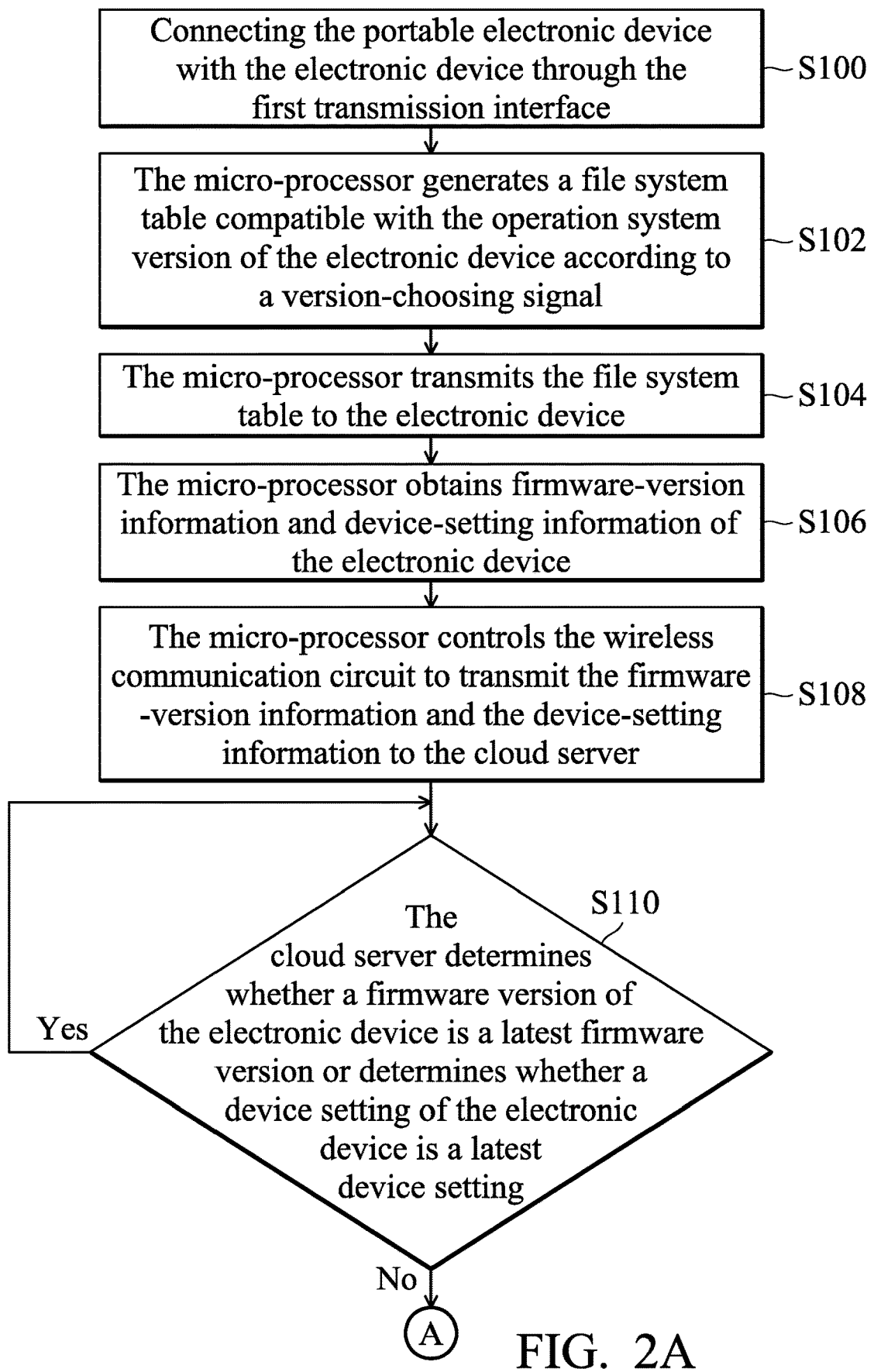
FIG. 2A and FIG. 2B are flow charts of a data updating method according to an embodiment of the present disclosure.
Figure 2B:
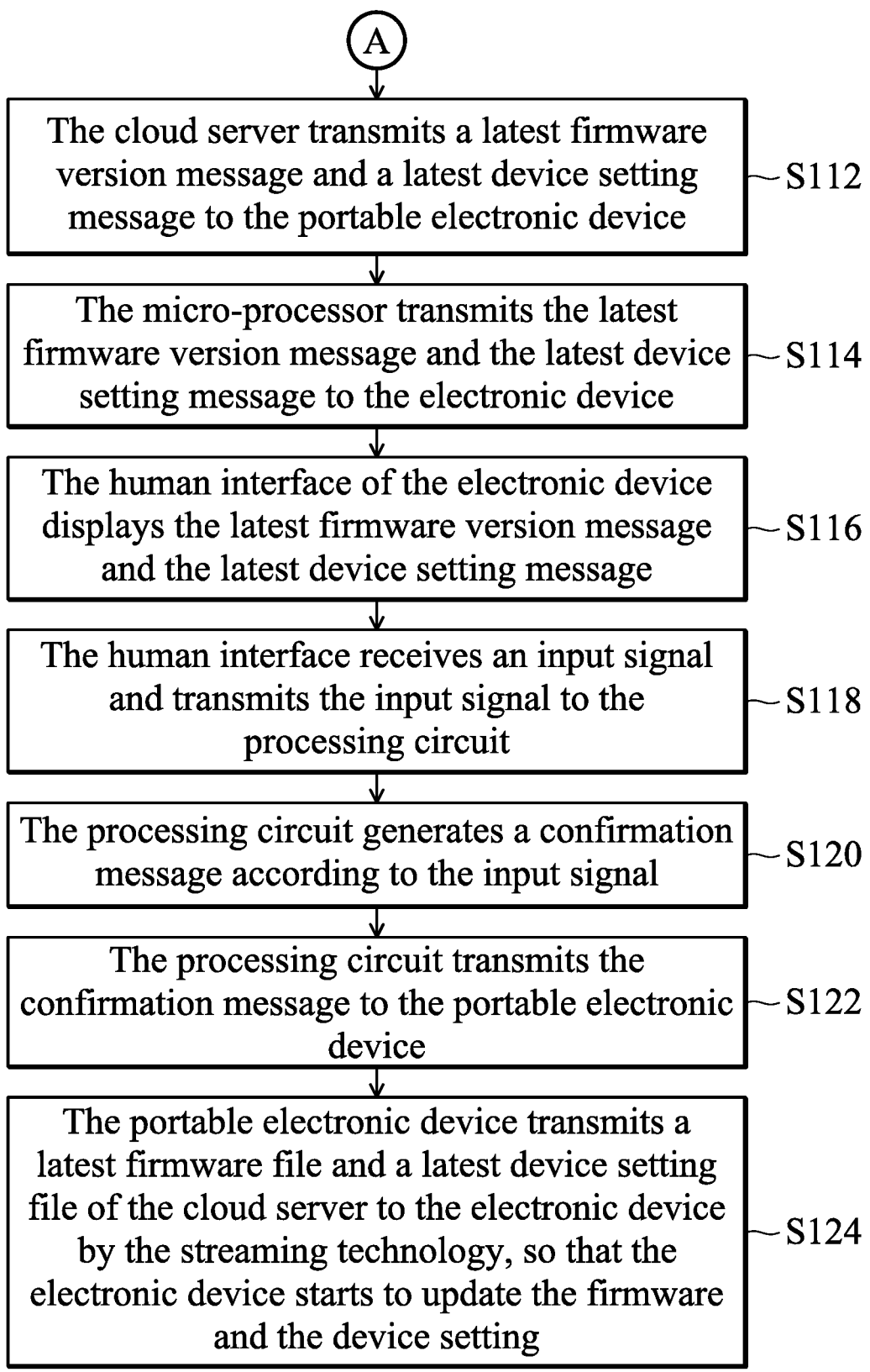

FIG. 2A and FIG. 2B are flow charts of a data updating method according to an embodiment of the present disclosure. In step S100, the portable electronic device 200 connects to the electronic device 300 through the first transmission interface 202. In step S102, the microprocessor 206 of the portable electronic device 200 generates a file system table compatible with the operation system version of the electronic device 300 according to a version-choosing signal. In step S104, the microprocessor 206 transmits the file system table to the electronic device 300, so that the electronic device 300 recognizes the portable electronic device 200.

In step S106, the microprocessor 206 of the portable electronic device 200 obtains firmware-version information and device-setting information of the electronic device 300. In step S108, the microprocessor 206 controls the wireless communication circuit 204 of the portable electronic device 200 to transmit the firmware-version information and the device-setting information to the cloud server 400.

In step S110, the cloud server 400 determines whether a firmware version of the electronic device 300 is the latest firmware version according to the firmware-version information or determines whether a device setting of the electronic device 300 is the latest device setting according to the device-setting information. If the firmware version and the device setting of the electronic device 300 are the latest firmware version and the latest device setting, the procedure goes back to Step S110. If the firmware version of the electronic device 300 is not the latest firmware version or the device setting of the electronic device 300 is not the latest device setting, step S112 is performed. In step S112, when the cloud server 400 determines that the firmware version of the electronic device 300 is not the latest firmware version or the device setting of the electronic device 300 is not the latest device setting, the cloud server 400 transmits the latest firmware version message and the latest device setting message to the portable electronic device 200.

In step S114, the microprocessor 206 transmits the latest firmware version message and the latest device setting message to the electronic device 300. In step S116, the human interface 306 of the electronic device 300 displays the latest firmware version message and the latest device setting message to inform the user.

In step S118, the human interface 306 receives an input signal which is input by the user, and the human interface 306 transmits the input signal to the processing circuit 304. In step S120, the processing circuit 304 generates a confirmation message according to the input signal. In step S122, the processing circuit 304 transmits the confirmation message to the portable electronic device 200 through the second transmission interface 302. In step S124, when the portable electronic device 200 receives the confirmation message, the portable electronic device 200 downloads the latest firmware file and the latest device-setting file stored in the cloud server 400 and transmits the latest firmware file and the latest device-setting file to the electronic device 300 using streaming technology, so that the electronic device 300 starts to update the firmware and the device setting.

In contrast to the prior art, the present disclosure provides an updating system 100 which includes a portable electronic device 200, an electronic device 300, and a cloud server 400. The maintenance personnel of the electronic device 300 only needs to connect the portable electronic device 200 to the electronic device 300, and then some information, such as the firmware version and the device setting, of the electronic device 300 can be obtained through the portable electronic device 200. In addition, the cloud server 400 receives the information to determine whether the firmware version of the electronic device 300 is the latest firmware version or whether the device setting of the electronic device 300 is the latest device setting. If the firmware version is not the latest firmware version or the device setting is not the latest device setting, the portable electronic device 200 fetches the latest firmware file and the latest device-setting file from the cloud server 400 using streaming technology and transmits the latest firmware file and the latest device-setting file to the electronic device 300, so as to update the firmware and the device setting of the electronic device 300.

Therefore, maintenance personnel do not need to prepare several devices storing different version of the firmware files and the device-setting files to update different electronic devices, such as different coffee machines. The maintenance personnel can maintain different electronic device only using a single portable electronic device 200. As a result, the present disclosure solves the problem of the conventional updating method consuming a lot of manpower making it inconvenient to manage data. Moreover, the cloud server 400 determines and chooses the best device-setting file among several device-setting files as the latest device-setting file according to the date, the season, the location, the altitude, the humidity, and so on, of the electronic device 300, so as to achieve the purpose of customization.

It should be understood that the elements and features recited in the appended claims may be combined in different ways to produce new claims that likewise fall within the scope of the disclosure. Thus, whereas the dependent claims appended below depend from only a single independent or dependent claim, it should be understood that these dependent claims may, alternatively, be made to depend in the alternative from any preceding or following claim, and that such new combinations are to be understood as forming a part of the specification of the disclosure.

While the disclosure has been described by way of example and in terms of the preferred embodiments, it is to be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A portable electronic device, applied to update data, the portable electronic device comprising:
    a Universal Serial Bus (USB) port, configured to be physically connected to an electronic device without any module to be connected to internet, wherein the electronic device is an electromechanical device;
    a wireless communication circuit, configured to be connected to a cloud server through the Internet, wherein the wireless communication circuit comprises a mobile communication module, a WIFI module and a Bluetooth communication module; and
    a microprocessor, wherein the microprocessor obtains firmware-version information and device-setting information of the electronic device through the USB port, and the microprocessor controls the wireless communication circuit to send the firmware-version information and the device-setting information to the cloud server;
    wherein when the cloud server determines that a firmware version of the electronic device is not a latest firmware version according to the firmware-version information and determines that a device setting of the electronic device is not a latest device setting according to the device-setting information, the portable electronic device fetches a latest firmware version message and a latest device setting message from the cloud server, and transmits the latest firmware version message and the latest device setting message to the electronic device;
    wherein the portable electronic device is small in size such that the portable electronic device has a shape and appearance similar to a USB flash drive;
    wherein when the portable electronic device transmits the latest firmware version message and the latest device setting message to the electronic device, the electronic device displays the latest firmware version message and the latest device setting message,
    wherein when the portable electronic device receives a confirmation message from the electronic device, the portable electronic device transmits a latest firmware file and a latest device-setting file stored in the cloud server to the electronic device using streaming technology; and
    wherein the latest device-setting file is determined according to the date, the season, the location, the altitude, and the humidity of the electronic device.

2. The portable electronic device as claimed in claim 1, wherein the electronic device further comprises an operation system version, the microprocessor generates a file system table compatible with the operation system version according to a version-choosing signal, and the microprocessor controls the transmission interface to send the file system table to the electronic device, so that the electronic device recognizes the portable electronic device.

3. The portable electronic device as claimed in claim 2, wherein the portable electronic device further comprises an input interface, and the input interface generates the version-choosing signal according to an input signal.

4. The portable electronic device as claimed in claim 2, wherein the wireless communication circuit of the portable electronic device obtains the version-choosing signal from a mobile device, and the mobile device generates the version-choosing signal according to the operation system version.

5. The portable electronic device as claimed in claim 1, wherein the portable electronic device is connected to the cloud server through a wireless base station or a wireless router, wherein the portable electronic device communicates with a mobile device through the Bluetooth communication module, and the portable electronic device transmits the latest firmware version message and the latest device setting message to the mobile device, wherein the latest firmware version message and the latest device setting message are sent from the cloud server.

6. The portable electronic device as claimed in claim 1, wherein the portable electronic device is connected to the cloud server through a mobile device, wherein the mobile device operates in a hotspot mode, so as to serve as a wireless router.

7. The portable electronic device as claimed in claim 1, wherein the cloud server stores a plurality of firmware files and device-setting files related to the electronic device, and the firmware files and the device-setting files are managed by a remote management device.

8. The portable electronic device as claimed in claim 1, wherein the electronic device is a coffee machine or an air conditioner.

9. A data updating method, applied to a cloud service, an electronic device and a portable electronic device, the data updating method comprising:
    physically connecting the portable electronic device with the electronic device through a USB port, wherein the electronic device is without any module to be connected to internet, wherein the electronic device is an electromechanical device, wherein the portable electronic device is small in size such that the portable electronic device has a shape and appearance similar to a USB flash drive;

obtaining firmware-version information and device-setting information of the electronic device by a microprocessor of the portable electronic device;

transmitting the firmware-version information and the device-setting information to the cloud server by the microprocessor which controls a wireless communication circuit of the portable electronic device, wherein the wireless communication circuit comprises a mobile communication module, a WIFI module and a Bluetooth communication module;

determining, by the cloud server, whether a firmware version of the electronic device is a latest firmware version according to the firmware-version information and determining, by the cloud server, whether a device setting of the electronic device is a latest device setting according to the device-setting information;

transmitting, by the cloud server, a latest firmware version message and a latest device setting message to the portable electronic device when the cloud server determines that the firmware version of the electronic device is not the latest firmware version or determines that the device setting of the electronic device is not the latest device setting; and transmitting, by the micro-processor, the latest firmware version message and the latest device setting message to the electronic device;

wherein the electronic device further comprises a human interface and a processing circuit, and the data updating method further comprises:

displaying the latest firmware version message and the latest device setting message by the human interface;

receiving an input signal and transmitting the input signal to the processing circuit by the human interface;

generating a confirmation message by the processing circuit according to the input signal;

transmitting, by the processing circuit, the confirmation message to the portable electronic device through the transmission interface; and transmitting, by the portable electronic device, a latest firmware file and a latest device-setting file of the cloud server to the electronic device using streaming technology when the portable electronic device receives the confirmation message, wherein the latest device-setting file is determined according to the date, the season, the location, the altitude and the humidity of the electronic device.

10. The data updating method as claimed in claim 9, wherein the electronic device further comprises an operation system version, and the data updating method further comprises:

generating, by the micro-processor, a file system table compatible with the operation system version according to a version-choosing signal; and transmitting, by the micro-processor, the file system table to the electronic device, so that the electronic device recognizes the portable electronic device.

11. The data updating method as claimed in claim 10, wherein the portable electronic device further comprises an input interface, and the input interface generates the version-choosing signal according to an input signal.

12. The data updating method as claimed in claim 10, wherein the portable electronic device further comprises a wireless communication circuit, the wireless communication circuit obtains the version-choosing signal from a mobile device, and the mobile device generates the version-choosing signal according to the operation system version.

13. The data updating method as claimed in claim 9, wherein the portable electronic device is connected to the cloud server through a wireless base station or a wireless router, wherein the portable electronic device communicates with the mobile device through the Bluetooth communication module, and the portable electronic device transmits the latest firmware version message and the latest device setting message to the mobile device, wherein the latest firmware version message and the latest device setting message are sent from the cloud server.

14. The data updating method as claimed in claim 9, wherein the portable electronic device is connected to the cloud server through a mobile device, wherein the mobile device operates in a hotspot mode, so as to serve as a wireless router.

15. The data updating method as claimed in claim 9, wherein the cloud server stores a plurality of firmware files and device-setting files related to the electronic device, and the firmware files and the device-setting files are managed by a remote management device.

16. The data updating method as claimed in claim 9, wherein the electronic device is a coffee machine or an air conditioner.

* * * * *